United States Patent
Nakash

(10) Patent No.: US 8,116,197 B2
(45) Date of Patent: Feb. 14, 2012

(54) METHOD FOR FINDING PROTECTED PATH IN MESH NETWORKS

(75) Inventor: Shell Nakash, Kfar-Sava (IL)

(73) Assignee: ECI Telecom Ltd., Petach Tikva (IL)

( * ) Notice: Subject to any disclaimer, the term of this patent is extended or adjusted under 35 U.S.C. 154(b) by 172 days.

(21) Appl. No.: 12/513,411

(22) PCT Filed: Oct. 28, 2007

(86) PCT No.: PCT/IL2007/001307
§ 371 (c)(1),
(2), (4) Date: May 4, 2009

(87) PCT Pub. No.: WO2008/053465
PCT Pub. Date: May 8, 2008

(65) Prior Publication Data
US 2010/0157794 A1    Jun. 24, 2010

(30) Foreign Application Priority Data

Nov. 2, 2006 (IL) .......................................... 179026

(51) Int. Cl.
*H04L 12/26* (2006.01)
(52) U.S. Cl. .......................... 370/228; 370/235; 370/238
(58) Field of Classification Search ........................ None
See application file for complete search history.

(56) References Cited

U.S. PATENT DOCUMENTS

| | | |
|---|---|---|
| 6,606,297 B1 | 8/2003 | Magill et al. |
| 7,315,510 B1 * | 1/2008 | Owens et al. .................. 370/218 |
| 7,406,032 B2 * | 7/2008 | Li et al. .......................... 370/217 |
| 7,420,989 B2 * | 9/2008 | Liu et al. ........................ 370/468 |

(Continued)

FOREIGN PATENT DOCUMENTS

EP    1 079 570 A2    2/2001

OTHER PUBLICATIONS

S. Balon, et al., "A scalable and decentralized fast-rerouting scheme with the efficient bandwidth sharing", Computer Networks, Dec. 13, 2005, p. 1-35.
G. Ranjith, et al., "A Distributed Primary-Segmented Backup Scheme for Dependable Real-Time Communication in Multihop Networks", 2002, p. 1-8, Proceedings of the International Parallel and Distributed Processing Symposium, IEEE, Computer Society.

(Continued)

*Primary Examiner* — Michael J Moore, Jr.
(74) *Attorney, Agent, or Firm* — Browdy and Neimark, PLLC

(57) ABSTRACT

A method of finding a primary communication path in a mesh network, which would be at once a protected path having a fully guaranteed segmented node or node-link protection. The method comprises defining a required protection type and further selecting each specific path segment of the desired communication path based on initial user's requirements and topology information of the network. Each specific node path segment N for the communication path is selected upon ensuring that it can be protected in the network by a node backup path satisfying the initial user's requirements. Each specific link path segment L for the communication path is chosen if it can be protected in the network by a link backup path satisfying the initial user's requirements and if the node path segment N to which segment L leads cannot be protected by a suitable node backup path.

10 Claims, 13 Drawing Sheets

U.S. PATENT DOCUMENTS

| | | | | |
|---|---|---|---|---|
| 7,460,469 B2* | 12/2008 | Goldberg et al. | | 370/218 |
| 7,652,983 B1* | 1/2010 | Li et al. | | 370/217 |
| 7,719,960 B2* | 5/2010 | Atlas et al. | | 370/222 |
| 7,830,786 B2* | 11/2010 | Atlas et al. | | 370/217 |
| 7,853,715 B1* | 12/2010 | Katukam et al. | | 709/239 |
| 2003/0063613 A1* | 4/2003 | Carpini et al. | | 370/401 |
| 2003/0117950 A1* | 6/2003 | Huang | | 370/220 |
| 2003/0229807 A1 | 12/2003 | Qiao et al. | | |
| 2006/0164976 A1 | 7/2006 | Grover et al. | | |
| 2006/0209682 A1* | 9/2006 | Filsfils et al. | | 370/219 |
| 2007/0165515 A1* | 7/2007 | Vasseur | | 370/216 |
| 2007/0280102 A1* | 12/2007 | Vasseur et al. | | 370/225 |

OTHER PUBLICATIONS

S. Nikolopoulos, et al., "Addressing Network Survivability Issues by Fingding the K-best Paths through a Trellis Graph", Proceedings of INFOCOM '97 Apr. 7-11, 1977, Apr. 1977, p. 1-8, IEEE.

Y. Liu., et al., "Successive Survivable Routing for Node Failures".

* cited by examiner

METHOD FOR FINDING PROTECTED PATH IN MESH NETWORKS

FIELD OF THE INVENTION

The present invention relates to the field of data networking, more particularly to finding a protected path in a mesh communication network, and in a specific case—to methods for computing MPLS label switched paths with guaranteed fast reroute (FRR) protection.

BACKGROUND OF THE INVENTION

The problem of determining a protected path in a mesh communication network is relevant for various types of networks and for various data protocols applicable in such networks. For the sake of better illustration, the problem will be presented and analyzed using a modern example of Multiprotocol Label Switching (MPLS) networks.

MPLS is an emerging technology that improves the scalability and performance of IP (Internet Protocol) networks along with providing new services previously unavailable with traditional IP. In particular, MPLS enables service providers to engineer the traffic in their networks and offer quality-of-service (QoS) based services, including guaranteed capacity (bandwidth, BW). With MPLS, a source label switching router (LSR) inserts labels into packets arriving from a source system (e.g., a computer); all these labeled packets then follow the same label switched path (LSP) towards the destination LSR, which pops the label off the packet and transfers it to the destination system.

FIG. 1 illustrates an LSP path that originates at a source node LSR A, travels through a transit node LSR B, and ends at a destination node LSR C. Thus, all the packets that are mapped by LSR A into the LSP follow the path A->B->C. Also, it is shown that packets are appended with MPLS label at source LSR A and freed from the MPLS label at destination LSR C.

A major MPLS feature is a mechanism called fast reroute (FRR). FRR allows to rapidly reroute LSPs onto a preconfigured backup LSP around a network link or node failure, where the former case is referred to as FRR link protection while the latter is referred to as FRR node protection. When a protected link or node fails, the traffic of the primary LSPs is switched over to a backup LSP towards the next hop (NH) LSR or next-next-hop (NNH) LSR, respectively. The backup LSP remerges with the original path of the primary LSPs at NH or NNH, which redirects the traffic to the primary LSP. Note that this application assumes that a node protecting backup LSP merges with the primary LSP path at NNH and not further along the LSP path (e.g., not at NNNH). A backup LSP can be shared by multiple LSPs. With FRR, an interrupted traffic stream can be rerouted around a failed node/link within a short time interval of sub 50 milliseconds, thereby minimizing impact on the traffic.

FIG. 2 illustrates the FRR link protection. An LSP 1 (thick line) and an LSP 2 (thin line) normally flow along the path A->B. When the link between LSR A to LSR B fails, LSR A reroutes both LSP 1 and LSP 2 into a backup LSP (dotted line) that flows to LSR B (NH) through LSR C (the backup LSP is shared by LSP 1 and LSP 2, this is possible as noted earlier). The path of the backup LSP remerges with the original path of LSP 1 and LSP 2 at NH (next hop) LSR B, which redirects the traffic back into LSP 1 and LSP 2, respectively.

FIG. 3. illustrates FRR node protection. Let LSP 1 (thick line) and LSP 2 (thin line) normally flow along the path A->B->C. When LSR B fails, LSR A reroutes both LSP 1 and LSP 2 into a backup LSP (dotted line) that flows to LSR C (NNH) through LSR D. The path of the backup LSP remerges with the original path of LSP 1 and LSP 2 at NNH (next next hop) LSR C, which redirects the traffic back into LSP 1 and LSP 2, respectively.

For the protection to be valid, the primary LSP and its backup LSPs must be diversely routed (disjoint), otherwise the backup LSP will fail once the protected link or node fails. Using the examples of FIG. 2 and FIG. 3, the path of a link protecting backup LSP (e.g., the dotted path shown in FIG. 2) must not use the protected link (link AB in FIG. 2), and the path of a node protecting backup LSP (e.g., the dotted one in FIG. 3) must neither use the protected node (node B in FIG. 3) nor any of its links.

Detection of a link failure can be based on alarms of a physical communication layer (e.g., SONET/SDH) detected on that link (link AB in FIG. 2). Detection of a node failure can be based on alarms of either a network or a link communication layers (e.g., OSPF or PPP, respectively). Sometimes, and preferably due to the fast detection mechanism, a node failure can be detected using physical communication layer alarms on the link upstream the failed node (link AB in FIG. 3). In the latter case, an LSP may be assigned a link protecting backup LSP or a node protecting backup LSP per hop but not both, since it is not possible to distinguish between a link and a node failure. To be applicable for all these failure detection scenarios, this application will also assume that an LSP can be assigned either the link protection or the node protection per hop, but not both.

FRR protection can be defined as a segmented backup scheme, since it is based on providing a backup LSP to protect against a failure of a single segment (node or link) along the path of the primary LSP. Thus, to fully protect an LSP, multiple backup LSPs are required, one backup LSP per protected segment. Though the path of the backup LSP for each protected segment must be disjoint from the path of the primary LSP on that segment, it is allowed to share links and nodes with the primary LSP on other segments, and to share links, nodes, and may also share bandwidth with backup LSPs protecting the other segments of the primary LSP. This sharing can extremely increase the chances that a set of backup LSPs that can fully protect an LSP actually exists. For example, the path of a backup LSP in FIG. 2 must not use the protected link AB, but can use any other link along the path of the primary LSPs 1 and 2, e.g., the link with which LSP 1 and LSP 2 arrive at LSR A.

An important aspect in MPLS implementation is how to compute a path that meets the LSP requirements. Path computation may be done by a Source LSR, or by a route server/network management system. Input data for a path finding algorithm includes the LSP requirements and so-called traffic-engineered (TE) network topology, where the term TE is used to indicate that the topology includes quality-of-service (QoS) related information such as available capacity of network segments.

The LSP requirements include the source LSR, destination LSR, and additional attributes, such as LSP bandwidth (capacity) and FRR protection requirements; additional requirements can be class of service (CoS), hop limit, bidirectionality, etc.

The TE topology can be represented as a weighted directed graph of nodes and interconnecting links, where each node and link is associated with resources (or TE topology constraints). In particular, each link connecting an outgoing port of one LSR with an incoming port of another LSR is associated with a weight a.k.a metric or cost, available BW (optionally, per a required Class of Service CoS), and information on available backup LSP.

Backup LSP knowledge may be maintained by a path computation server (PCS), which can be any kind of LSR or a network management system. The source LSR would then request the backup LSP information from the PCS, when it (the source LSR) needs to compute a path for an FRR protected LSP. Alternatively, the source LSR may request the PCS to compute the path of the FRR protected LSP itself.

The result of a path finding algorithm is an optimum feasible path that meets the LSP requirements without violating the TE topology constraints. There are various optimization criteria, of which the most popular is the shortest path, in which it is desired to find the least total metric feasible path. The LSP path finding based on the shortest path criterion is usually referred to as "constrained shortest path first" (CSPF). CSPF has two heuristic phases: (1) In the first phase, all the infeasible links ("link directions") are pruned. With respect to bandwidth availability, this means that any link direction that does not satisfy the BW requirements of the LSP must be excluded from the TE topology. (2) In the second phase, the shortest path between the source LSR and the destination LSR is computed using a standard algorithm such as Dijkstra algorithm.

FIG. 4 illustrates a TE topology containing four LSRs (A,B,C,D) interconnected with links, where each link direction (arrow) has a preconfigured metric and available bandwidth BW. For example, there is a link direction from LSR B to LSR D, having metric=5 and available BW=100; the metric and the BW (in brackets) are shown in a rectangular label shown near the link direction. Source/destination LSRs A and C are shown as dark boxes, while transit LSRs are shown as white boxes.

Suppose that it is required to compute a path to an LSP with BW=200 from LSR A to LSR C.

Phase 1: all the infeasible links are pruned, yielding the topology shown in FIG. 5. For example, the link direction from B to D is pruned because it has BW=100<200.

Phase 2: the shortest path is computed. In this case, there remained only two possible paths from LSR A to LSR C:

(1) Path A->C, with the metric equal to 2
(2) Path A->D->C, with the metric of 6+3=9.

Note that a path that traverses an LSR more than once (e.g., A->D->A->C) thereby forming a "traffic loop" is forbidden, and is thus not taken into account. The path A->C is the shortest one, and is thus selected as shown in FIG. 6. In this example, the shortest path computation is very simple; in a general case, a systematic method such as Dijkstra or Bellman-Ford algorithm is used.

Path computation gets more complicated when the LSP to be established has FRR protection requirements. Such requirements may ask for: (1) link protection; (2) node protection (except for the last link direction on path which should have link protection); (3) node-link protection, where either node or link protection is required, and where node protection (wherever available) should be preferred over link protection.

A problem arises when the FRR protection must be guaranteed along the LSP path. That is, the primary LSP must be protected against any single segment (link or node) failure along its path. Such an LSP is considered to be a fully FRR protected primary LSP. Any path that does not satisfy this requirement must be rejected.

If the desired guaranteed FRR is link protection, simple pruning of link directions that are not provided with link protection (Phase 1) can work. For example, if only the link direction from A to C in FIG. 4 has the link protection (i.e., there is a backup LSP from A to C that protects against a failure of the link direction A->C), the pruned topology would be as shown in FIG. 6. In this case, there is only one feasible path for the required LSP: A->C.

The problem is that the simple pruning rule of Phase 1 sometimes does not help when a network user requires a guaranteed FRR node protection or a guaranteed FRR node-link protection. It happens because the LSP path of interest is not known during Phase 1 of the path finding procedure. For example, in the topology of FIG. 7 there is a backup (dotted) LSP to protect against failure of node B if the LSP path is A->B->C. However, there is no backup LSP to protect against failure of node B if the LSP path is A->B->E; therefore, the link direction A->B is feasible if LSP path is A->B->C but is infeasible if LSP path is A->B->E. Since the LSP path is unknown in Phase 1, pruning the link direction A->B in Phase 1 would be a wrong act because the LSP path of interest might be possibly chosen to use the path A->B->C in Phase 2.

A two step approach for a segmented backup scheme is used in "A Scalable and Decentralized Fast-Rerouting Scheme with Efficient Bandwidth Sharing" by Simon Balon et al., Dec. 13, 2005: it first computes a primary LSP path using one of the available algorithms, such as the two phase CSPF described earlier. For the obtained candidate path the algorithm then tries to assign backup LSPs. The disadvantage of this approach is that it cannot assure a fully FRR protected primary LSP even if such one does exist. As mentioned in the article, "When the primary path is known we compute the set of backup LSPs required to prevent any possible node failure along this path. If a backup path cannot be found under the node-failure assumption, we assume that only a link failure will occur and compute a new backup path. If it fails again, the request is rejected."

Another two step approach for a segmented backup scheme is used in "A Distributed Primary-Segmented Backup Scheme for Dependable Real-Time Communication in Multihop Networks" by Ranjith et al., 2002: it recognizes the advantages of the segmented backup scheme (as is the FRR protection) over non-segmented backup but it assumes that the primary path is already chosen and all that remained is to compute optimal backup paths for it. However, if the primary path is already chosen, it may traverse links and nodes with no available backup LSPs, and thus the protection cannot be guaranteed. As mentioned in the article, "The distributed algorithm has to be executed twice, i.e., the first time for finding a minimal cost primary path between the source and the destination, and the second time for finding a set of minimal total weight segmented backups for this primary path."

US patent publication 2003/0229807 A1 describes a segment protection technique for a network, comprising two steps: calculating an optimal (shortest) active path (AP), dividing it into several active segments (AS) and then protecting each AS with a detour called backup segment or BS. Actually, the US publication 2003/0229807 describes yet another version of the known principle "active path first" (APF).

A similar approach is described by Yu Liu and David Tipper in their article "Successive Survivable Routing for Node Failures", where working paths are given before pre-planned backup paths are routed and reserved.

Another known approach is called the K Shortest Paths (KSP) method, in which the algorithm finds K shortest active paths (APs) and then tests them one by one in the increasing order of their costs until a backup path is found or all of them have been tested. Since the KSP method is based on a limited number of a priori chosen APs, it might not find a protected path even if such one exists.

Based on the above, it can be seen that the task of finding a guaranteed segment-protected path in a mesh network (say, a fully FRR protected primary LSP in an MPLS network) cannot be effectively resolved using any of the above-mentioned 2-phase path finding algorithms.

At the same time, the guaranteed FRR protection is of prime importance to service providers. The essence of many Internet applications such as e-business and e-commerce is the ability to offer customers round-the-clock, uninterrupted access to the Internet. Fault or failure in a fiber optic link or routing/switching node that makes up the internet can knock out an internet service provider's vital link to their customers. When forwarding packets at the speed of 10 giga bits per second or more, a single second of inactivity means that millions of bytes of precious customer's data are discarded and the QoS guarantees are gone the same way; not to mention mission-critical applications where such failures could have catastrophic consequences.

OBJECT AND SUMMARY OF THE INVENTION

It is therefore the object of the present invention to provide a path selection method that is able to find an optimal communication path in a mesh network, which would have a fully guaranteed segmented node or node-link protection. In a particular practical case, the specific object is finding a primary LSP in a mesh MPLS network, with a fully guaranteed FRR node or node-link protection.

The above object can be achieved by providing a method for selecting a protected communication path between a source node and a destination node in a mesh network, wherein the path being characterized by full node protection or full node-link protection, such that in the path assembled from path segments each comprising either a node path segment N or a link path segment L, each of said path segments is protected with a backup path in the network, and wherein each node path segment N comprises a node, a link incoming said node and a link outgoing said node, while each link path segment L comprises a single link outgoing from one associated node and incoming into another associated node, the method comprises selecting said protected communication path as a primary path, by:

defining a required protection type being either a node protection or a node-link protection, and further selecting each specific path segment of said communication path based on initial user's requirements and topology information of the network, wherein said selection of each specific path segment is performed using the following rules:

a) selecting a specific node path segment N for the communication path upon ensuring that said specific node path segment N can be protected in the network by a node backup path satisfying said initial user's requirements, b) selecting a specific link path segment L for the communication path, if said specific link path segment L can be protected in the network by a link backup path satisfying said initial user's requirements, and b1) in case of node protection, if the node to which this specific link path segment L leads is the destination of the primary path (i.e., is a so-called "last hop");

b2) in case of node-link protection requirement, if the node path segment N to which this specific link path segment L leads cannot be protected according to rule (a).

The method may be performed in one phase. However, when the first phase of the method determines a protected communication path with loop(s) (i.e., the path includes nodes which are traversed more than once), the loop(s) may be excluded using measures that will be mentioned further in the summary and in the detailed description.

Preferably in the method, the communication path is a Label Switched Path (LSP), the mesh network is a Multiprotocol Label Switching (MPLS) network, and said protection is a guaranteed Fast Re-route (FRR) segment protection.

The node protection requires protection against any single node failure along the communication path—except for the last hop that approaches the destination node; since the destination node cannot have node protection, the hop must have a link protection. The node-link protection requires protection against failure of any single node or link along the communication path, however the node protection should be preferred (say, with a configurable preference metric penalty value P) over link protection.

As can be seen, the rule (b2) covers both protecting the last hop (i.e., the last link path segment) of the communication path, and the way of selecting path segments for the communication path when the node-link protection is required.

The initial user's requirements comprise at least the following data:

(1) the mentioned source node (LSR); (2) the mentioned destination node (LSR); (3) Quality of Service (QoS) requirements, comprising at least a value of the required bandwidth/capacity of the communication path (LSP), that includes a so-called "best effort" case when the bandwidth can be zero; (4) one of the mentioned types of the required protection (FRR), either the guaranteed (full) node protection or the guaranteed (full) node-link protection. Additional (optional) requirements may comprise, for example, the maximal metric (length, cost, etc.) allowed for the path, class of service (CoS), path bidirectionality, explicit path constraints, a loop-free constraint (i.e. one node cannot be traversed more than once by the protected communication path), etc.

The method comprises using the topology information of the network. The topology information can be represented as a weighted directed graph of nodes and interconnecting links, where each node and link is associated with resources and/or topology constraints, including information concerning available node backup paths and link backup paths. In particular, each link connecting an outgoing port of one node (LSR) with an incoming port of another node (LSR) is associated with a weight a.k.a metric or cost, available BW (e.g., as calculated by the line payload rate minus the bandwidth reserved to existing LSPs in the network), and available backup paths (LSPs) for link protection and for node protection; additional resources can be available BW per class of service (CoS), shared risk link groups (SRLGs), etc. Example for node resources is the internal node memory available to store traffic parameters for LSPs.

Preferably, and according to the explanation given in the background of the invention:

a link backup path (LSP) for protecting a link path segment merges with the selected communication path (the primary LSP) at a Next Hop node (NH) being one of the two nodes associated with the link path segment, while a node backup path (LSP) for protecting a node path segment including an incoming link, a node and an outgoing link is assumed to merge with the primary LSP path at a Next Next Hop node (NNH), being the node to which the mentioned outgoing link arrives.

To assure the guaranteed segment protected communication path, the topology information concerning the available node backup paths (LSPs) and link backup paths (LSPs) are taken into account at the very beginning of the path finding algorithm (see step ii below).

For this purpose, the Inventor proposes the following version of the method:
  i. Preliminary pruning step: pruning the topology information to exclude there-from links and backup paths (LSPs) which do not satisfy the initial user's requirements from the point of bandwidth. In a general example, this includes links with insufficient bandwidth for the required CoS, and possibly nodes with insufficient internal resources (e.g., memory). The pruned topology information is represented as a pruned topology graph.

It should be noted, however, that the pruning step need not actually be applied preliminarily, to all infeasible links, but only to infeasible links that are realistic candidates for the primary path. For example, if the primary path is selected according to the shortest path criterion, and if there is a feasible (i.e., with sufficient bandwidth) path 1 with metric 100, and there is another path 2 with metric 200 whose feasibility was not determined yet, the feasibility of path 2 need not be checked at all since path 1 will anyway be preferred because it is shorter.

ii. Intra-node connectivity step: transforming the topology graph (preferably, the pruned topology graph) to a transformed graph, by adding to the topology graph fictitious intra-node links, wherein a fictitious intra-node link with a zero metrics is added into the node of a node path segment to interconnect the incoming link and the outgoing link of said node segment, if there is a node backup path bypassing said node path segment in the topology graph. Preferably, the node backup path merges with the selected communication path at NNH (i.e., extends from the node at the other link end of the incoming port to the node at the other link end of the outgoing port). If the node protection (only) is required, such zero-metrics intra-node links are sufficient.

For selecting the fully protected communication path with node-link protection, the transformed graph should comprise an additional operation of adding to the pruned topology graph further fictitious intra-node links with non-zero metrics, wherein a fictitious intra-node link with a non-zero metrics (or penalty P) is added to the node of a node segment to interconnect the incoming link and the outgoing link of said node segment in case there is no node backup path for that node path segment in the pruned graph, while there is a link backup path for the incoming link of that node path segment.

iii. The transformed graph can be further utilized for selecting a required communication path with full node or node-link protection, by applying any path computation algorithm. The computation algorithm may be, for example, the classic Dijkstra algorithm. However, if the protected path should be loop-free, loops may be avoided at the step iii by applying a so-called Constrained Dijkstra algorithm. Alternatively though less preferably, an iterative path computation algorithm may be fulfilled by pruning link(s) that form loop(s) from the obtained communication path in the transformed graph. Upon that, the path computation algorithm is re-applied to thus amended graph.

The above-defined technique proposes such a path finding method that, given the initial user's requirements (such as source/destination, bandwidth and other QoS requirements, and type of the required protection), the network topology information including the mentioned backup (LSP) information, is able to find an optimal communication path (LSP) with the guaranteed node or node-link protection (FRR protection), providing that such a path actually exists.

Preferably, the selected communication path that meets the initial user's requirements without violating the topology constraints is also the least total metric feasible path (so-called shortest path). However, other optimization criteria can be used for finding a required communication path, for example the longest path can be selected for checking the maximal possible delay in the network.

BRIEF DESCRIPTION OF THE DRAWINGS

The invention will be further described in detail with reference to the following non-limiting drawings, in which.

DETAILED DESCRIPTION OF THE INVENTION

FIGS. 1 to 7 have been referred to in the Background Description. In the following detailed description, general terms full/guaranteed node or node-link protection may be interchangeably used with the terms FRR segment protection, FRR node protection or FRR node-link protection, which are specifically suitable for MPLS networks. The same applies to the general terms node, path and specific terms LSR, LSP, respectively.

Figure 1:
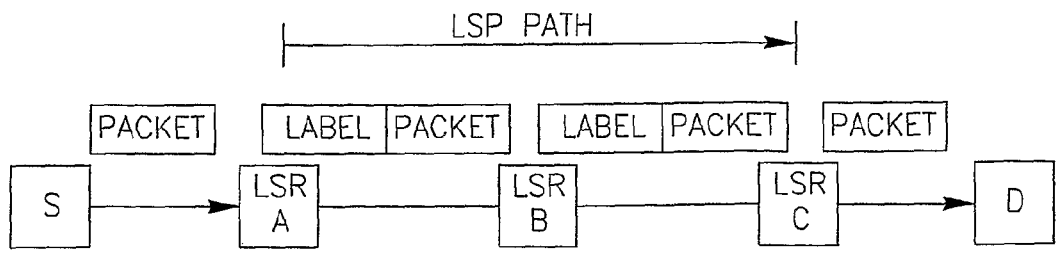
FIG. 1 (prior art) schematically illustrates an LSP path in an MPLS network.
Figure 2:
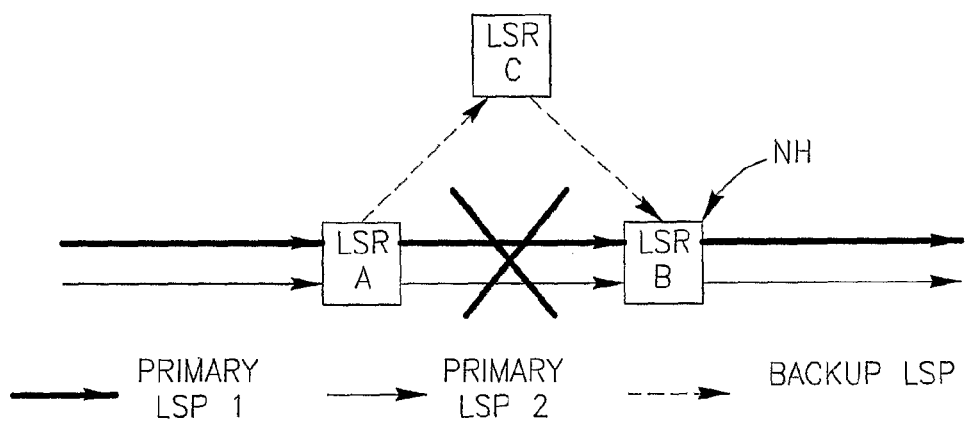
FIG. 2 (prior art) schematically illustrates a link segment protection 5 (link FRR).
Figure 3:
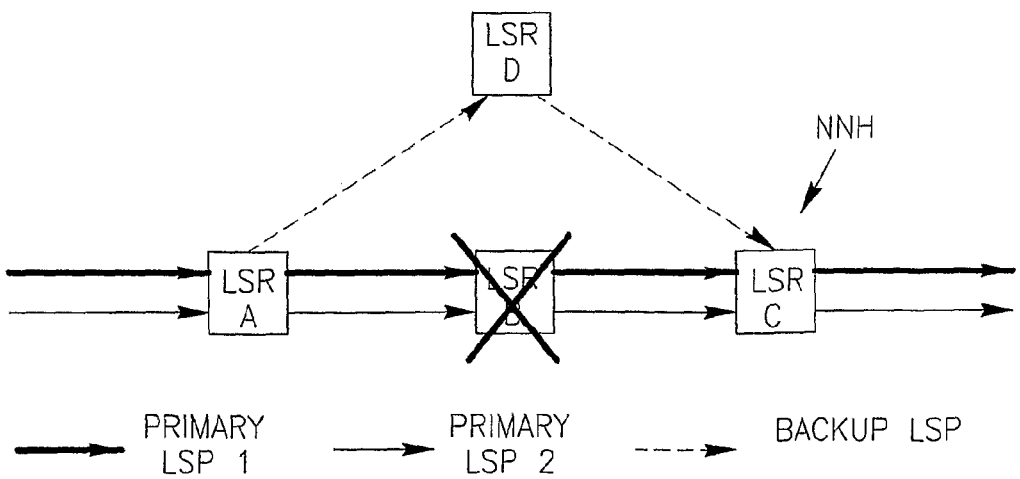
FIG. 3 (prior art) schematically illustrates a node segment protection (node FRR).
Figure 4:
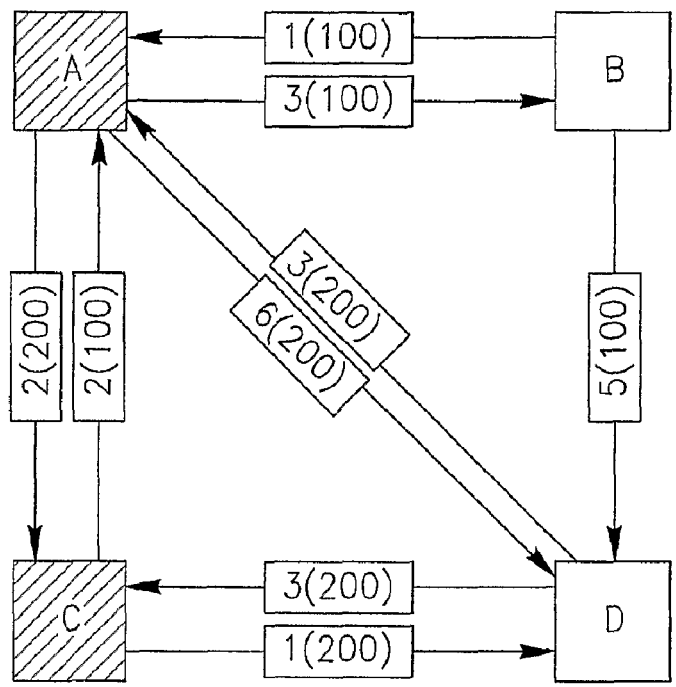
FIG. 4 (prior art) shows an example of a network topology.
Figure 5:
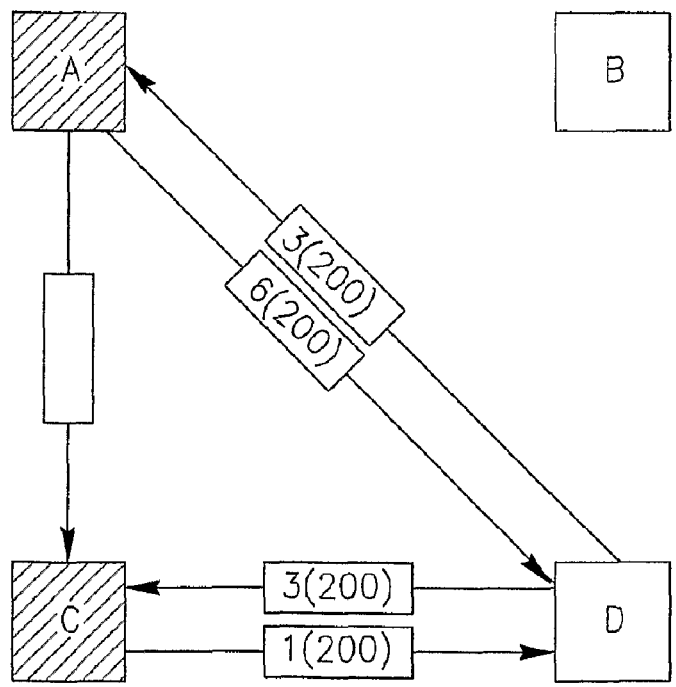
FIG. 5 (prior art) shows an example of pruned network topology obtained from the topology shown in FIG. 4.
Figure 6:
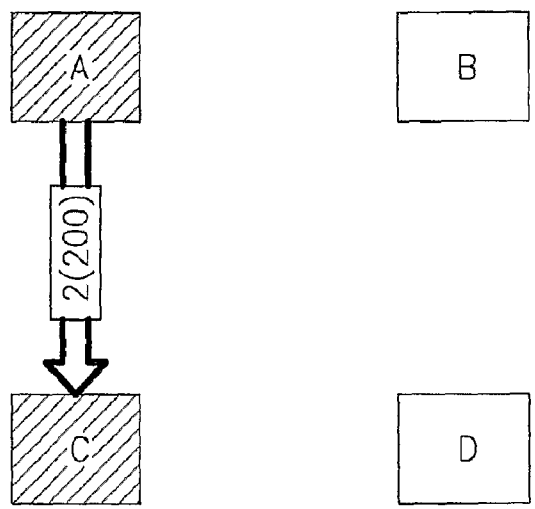
FIG. 6 (prior art) shows a selected communication path, picked from the pruned network topology shown in FIG. 5.
Figure 7:
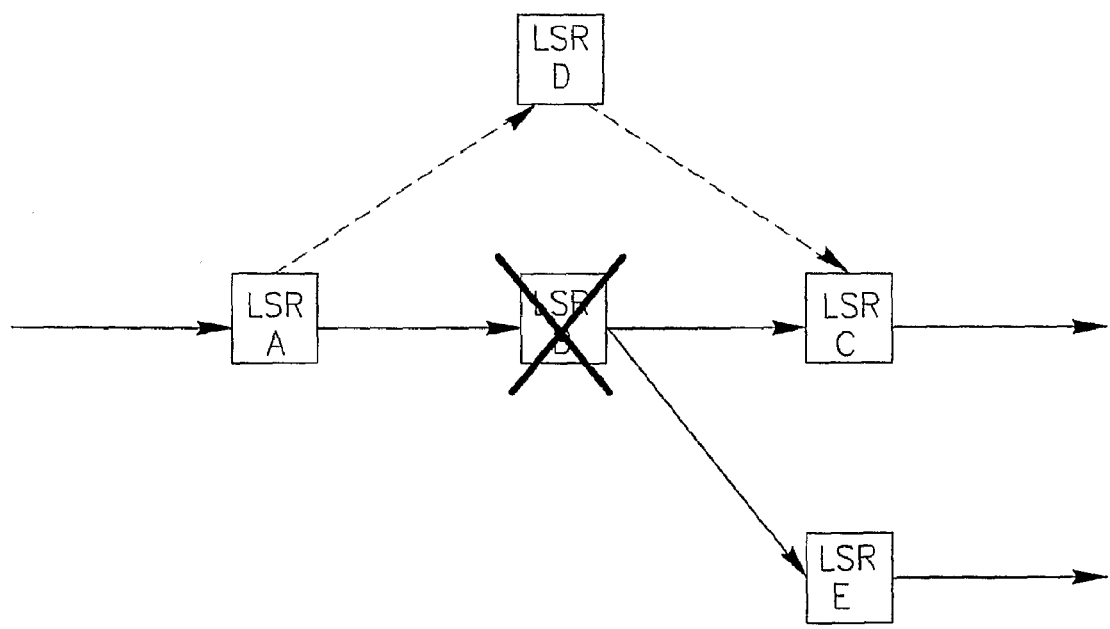
FIG. 7 illustrates that the known method of pruning does not suit for obtaining a guaranteed node segment protection.
Figure 8:
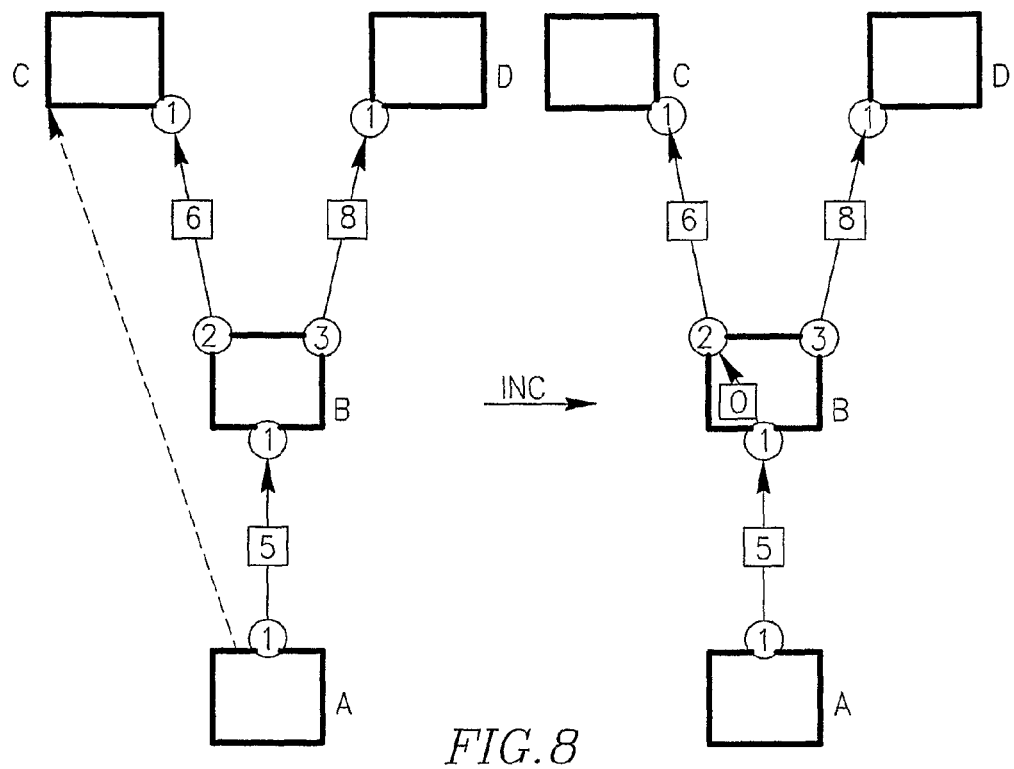
FIG. 8 illustrates an example of the proposed transforming of the network topology for selecting a guaranteed node protected communication path.

FIG. 8 displays introducing the intra-node connectivity operation (i.e., introducing fictitious intra-node links) into a network topology graph, for obtaining the guaranteed FRR node protection, for the link direction from node (LSR) A to node B. In this direction, the node A has a link to node B port 1, which in turn has a link from port 2 to node C port 1, and another link from port 3 to node D port 1. In that and other figures, ports of the nodes are shown as numbered circles, while values of metrics of the links are shown in small squares on the suitable links. Metrics can be understood as weights which may reflect length, cost, quality of the link, etc. The topology graph has also a node protecting backup segment (LSP, shown by a straight dotted line) starting at node A and terminating at node C, that provides protection against a failure of node B. During the intra-node connectivity step (shown as an arrow INC between the initial and a transformed graph), a zero metric intra-node link is assigned within the node B, in the direction from port 1 to port 2, because there is a backup LSP to protect a primary LSP path A to B to C against a failure of node B. The zero-metric ("free") fictitious intra-node link is marked with "0". Note that no zero metric intra-node link is assigned in the node B from port 1 to port 3, because there is no backup LSP to protect a primary LSP path A to B to D against a failure of node B. As a result, when selecting the required communication path on the obtained transformed graph, the primary, protected LSP path can pass from A to B to C but cannot pass from A to B to D.

The node protecting backup LSP A->C (shown by a straight dotted line) is shown in the drawing schematically only; in reality, it may traverse multiple intermediate LSRs except for the node B and its links (according to a so-called "node backup rule") because the links will fail too as soon as their node B fails.

Figure 9:
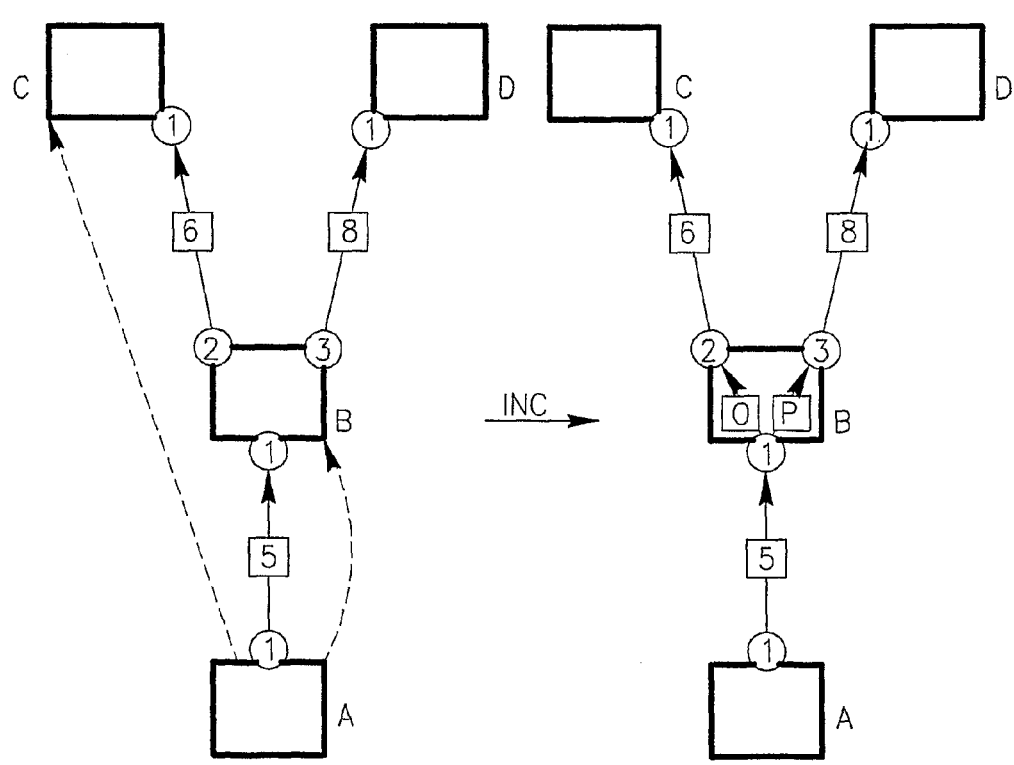
FIG. 9 illustrates an example of the proposed transforming of the network topology for selecting a guaranteed node-link protected communication path.

FIG. 9 displays introducing the intra-node connectivity into the network topology for obtaining a guaranteed FRR node-link protection for the link direction from node (LSR) A to node (LSR) B. The topology is similar to that in FIG. 8, but acknowledges the link direction from node A to B has also a link protecting backup LSP from A to B (shown in a curved dotted line). During the step of introducing the intra-node connectivity (INC), a zero metric intra-node link is assigned in the node B from port 1 to port 2 (as in FIG. 8), because there is a backup LSP to protect a primary LSP path A to B to C against a failure of B. However, in addition, a non-zero intra-node link marked "P" (penalty metric) is assigned in the node B from port 1 to port 3, because in case a potential LSP path A->B->D is selected, there is still a backup LSP to protect that potential LSP at least against a failure of the link direction from A to B. As a result, when the protected primary LSP path is selected, it will most probably pass from A to B to C, but may alternatively, with lower chances (due to the penalty metric P), pass from A to B to D. Preferably, the network designer will set P>0 to assign the preference to the node segment protection. However, setting P=0 can be used to assign to the FRR link protection the same preference as the FRR node protection.

The link protecting backup LSP A->B path (the curved dotted line) is shown schematically. In reality, it may traverse multiple intermediate LSRs but it must not use the same ports as the protected link (port 1 of node A and port 1 of node B) because they will fail too as soon as the main link direction from A to B fails ("link backup rule").

Figure 10:
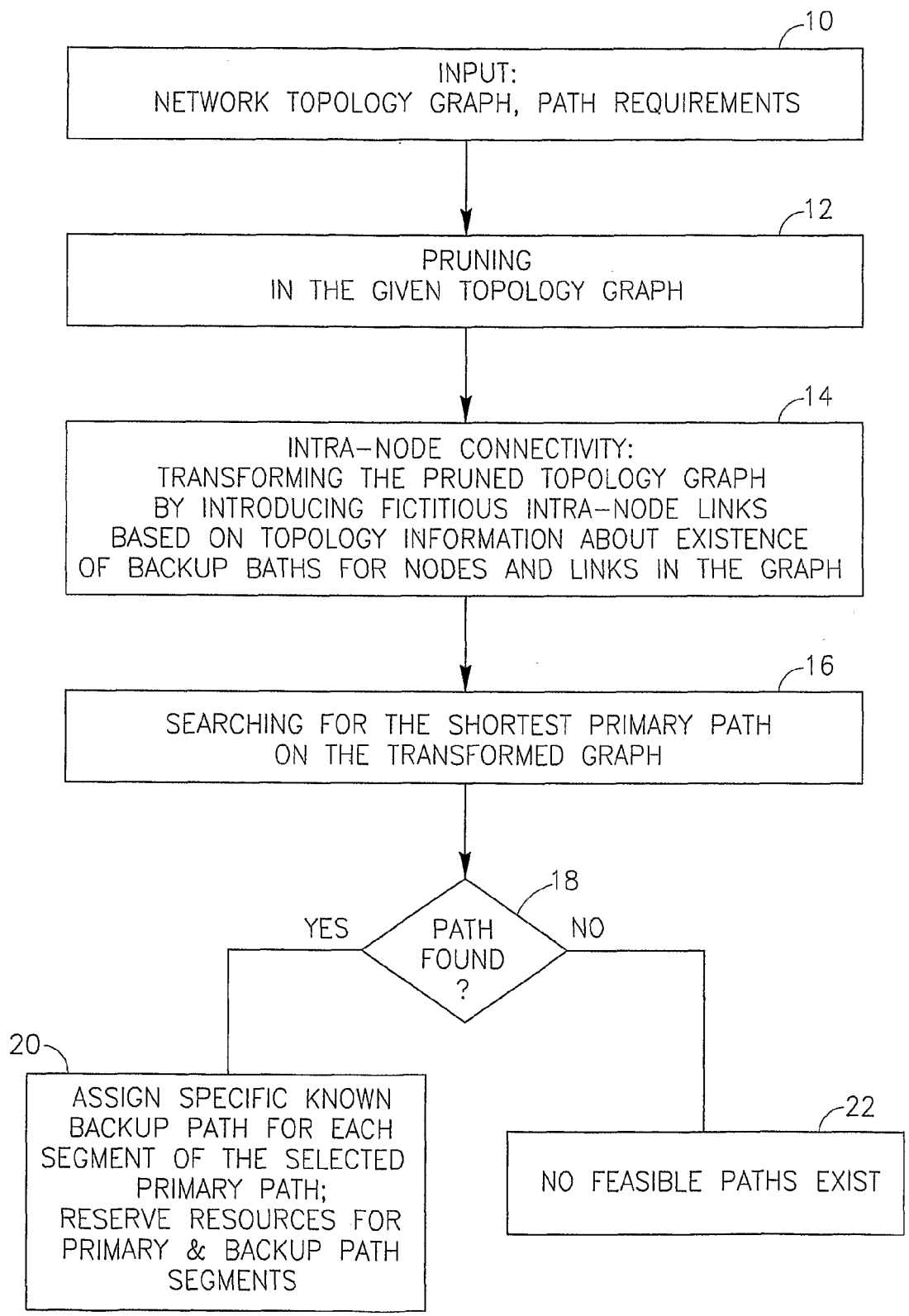
FIG. 10 shows a simplified flow chart of the proposed path finding algorithm

FIG. 10 illustrates a general flow chart of a preferred embodiment of the proposed method for selecting a fully protected communication path in a mesh network. Step 10 indicates that there is a) a given network topology graph reflecting various constrains of the network links and nodes (both physical and traffic-related), and b) initial user's requirements to the communication path to be found in the network.

Step 12 is a step of pruning, from the given topology graph, of links, nodes and backup paths (LSPs) with insufficient resources (i.e., not satisfying the user's requirements). Alternatively, this step can be performed in combination with step 16.

Step 14 is a step of introducing fictitious intra-node connectivity into the pruned graph. The way of introducing these fictitious intra-node links depends on existence, in the pruned graph, of backup paths for nodes and links thereof. It is explained in more details in FIG. 11 and in the detailed description. The step 14 results in obtaining a transformed topology graph.

Step 16 comprises applying any path finding algorithm to the transformed topology graph obtained at step 14, to obtain a primary communication path which, if exists, meets the guaranteed node or node-link protection requirement along all its segments. In this example, the path finding algorithm is the shortest path algorithm. However, the algorithm may have other criteria for finding a primary communication path.

Step 18 checks whether the path is found, and if yes, step 20 comprises assignment of specific known backup paths to segments of the selected primary path, and reserving resources for the primary path segments and for the specific backup paths.

Figure 11:
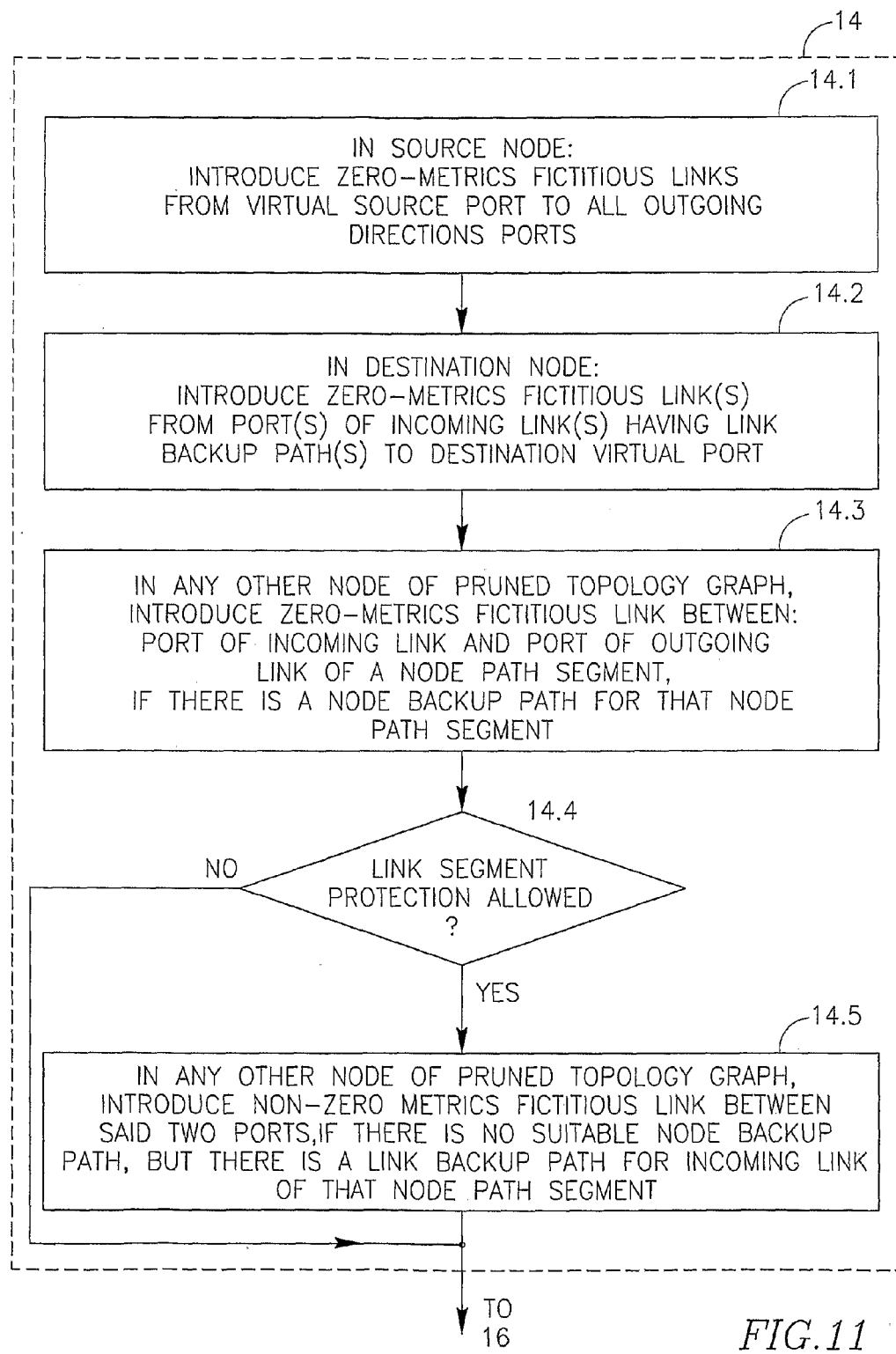
FIG. 11 shows a more detailed flow chart of the newly proposed step of transforming the network topology.

FIG. 11 illustrates step 14 of the proposed method in details.

Sub-step 14.1 concerns the Source node of the required path and comprises introducing zero-metrics fictitious links in the source node, from a virtual source port of the path to all ports connected to outgoing directions, to allow selecting the path in any possible direction in the network.

Sub-step 14.2 performs a similar operation in the Destination node, to allow reaching the destination from any possible direction in the network. A virtual port of the destination node is connected by zero-metrics fictitious link from any incoming ports.

Sub-steps 14.3 and 14.5 describe how the pruned graph is transformed in such a graph which will allow selecting therefrom only the segments which have guaranteed protection in the network.

Sub-step 14.3 allows introducing, in the pruned graph, zero-metrics fictitious links into the nodes that have node backup paths. Such a zero-metrics link is an intra-node "short-cut" between the incoming link and the outgoing link of the protected node segment, manifesting that the node segment is worth to be selected for the communication path.

However, sometimes the "node protection only" cannot be achieved in the network. If the mixed node-link protection is allowed according to the user's requirements (step 14.4), step 14.5 provides introducing additional fictitious links into the network nodes. These links are expected to be "more expensive" (non-zero metrics), to give preference to the zero-metrics ones. These intra-node non-zero metrics fictitious links are inserted in the nodes when its incoming link has a link backup path, but no node backup path exists from that link to the next-next-hop (NNH) NNH. A non-zero intra-node link is inserted between two ports, one being connected to the protected incoming link and the other to the outgoing link that leads to the NNH. In other words, if the node protection is not available from a link to NNH but a link protection is available and allowed, this link can still be used, yet with a lower preference.

Figure 12:
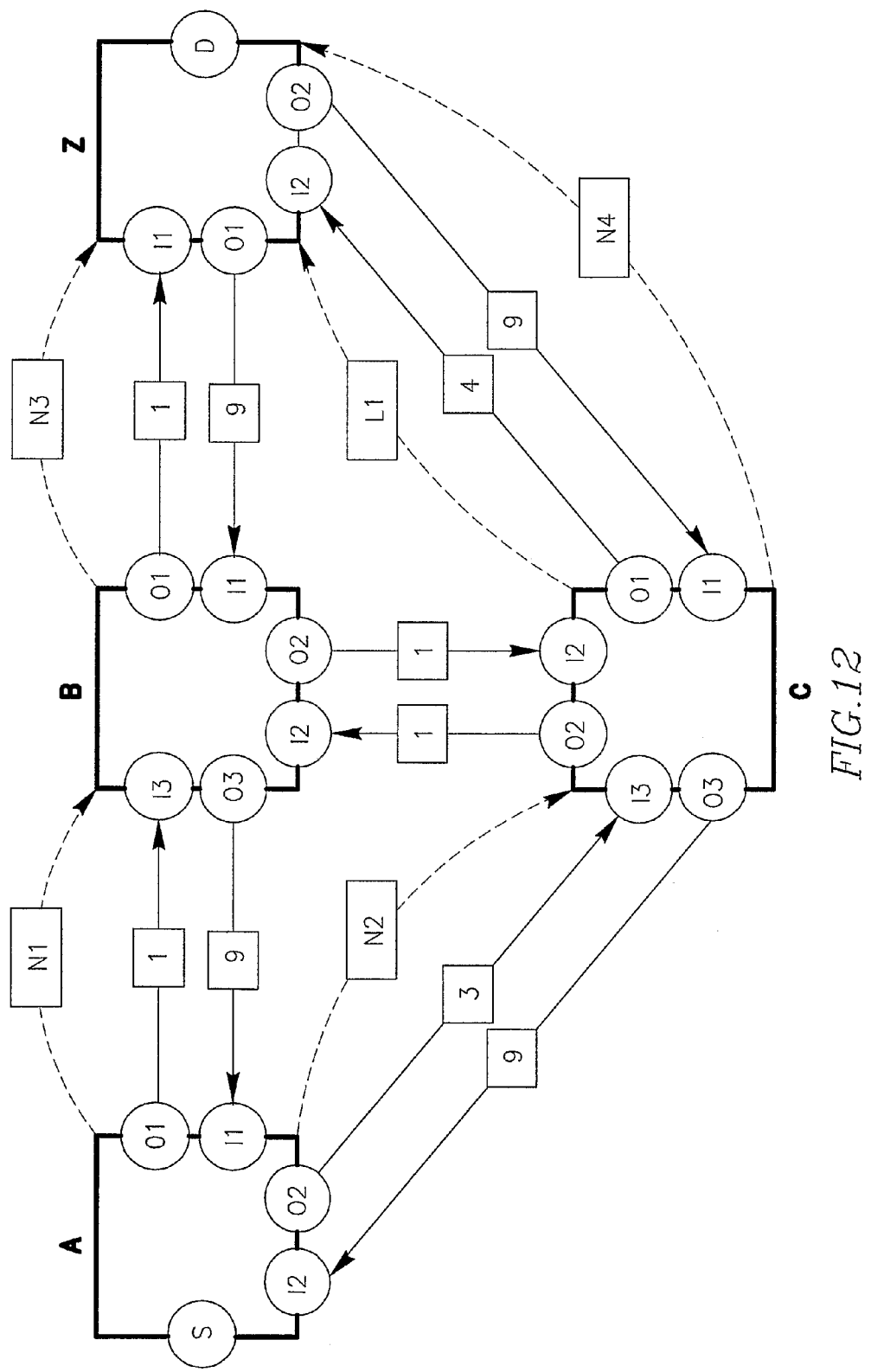
FIG. 12 illustrates another example of a network topology graph before introducing intra-node fictitious links.

FIG. 12 depicts a sample network topology graph comprising nodes (LSRs) A, B, C, and Z, interconnected as follows and forming the following backup paths for each other:

(1) bidirectional links AB (metric 1 from A to B and 9 from B to A), BZ, BC, AC, CZ (2) node protecting backup LSPs (dotted lines): A->B (marked as N1 and protecting against a failure of C), A->C (N2, B), B->Z (N3, C), C->Z (N4, B)

(3) link protecting backup LSP C->Z (marked as dotted line L1 and protecting against a failure of link direction from C to Z).

It is required to find a primary LSP path from A to Z, the required LSP must have the guaranteed FRR node protection (full node-segment protection).

We keep in mind that:

a) Since the last hop of the primary LSP can never be node protected (because if node Z fails, the LSP fails too), it will always be assumed in this application that the last hop should have a guaranteed link protection.

b) All links and backup LSPs are assumed to belong to the pruned topology graph (the preliminary pruning step as explained above), i.e. they all have available bandwidth satisfying the required LSP bandwidth;

c) Source (destination) LSR contains an LSP source (destination) point marked "S" ("D"), each of them is a virtual port that marks the origin (end) of the primary LSP, respectively.

d) All backup LSPs are assumed to obey the node backup rule and link backup rule that were defined previously.

In this simple example, it can be seen that there are 4 possible LSP paths (with each node appearing only once in the path, to avoid endless loops): A->B->C->Z, A->B->Z, A->C->B->Z, A->C->Z, of which only the first one is feasible due to having node protection on all hops (N2 in case of B failure, N3 in case of C failure) and link protection on last hop (L1 in case the link direction C toy Z fails).

However, on large networks the procedure requires rather complex computations and thus should be based on a systematic approach.

Figure 13:
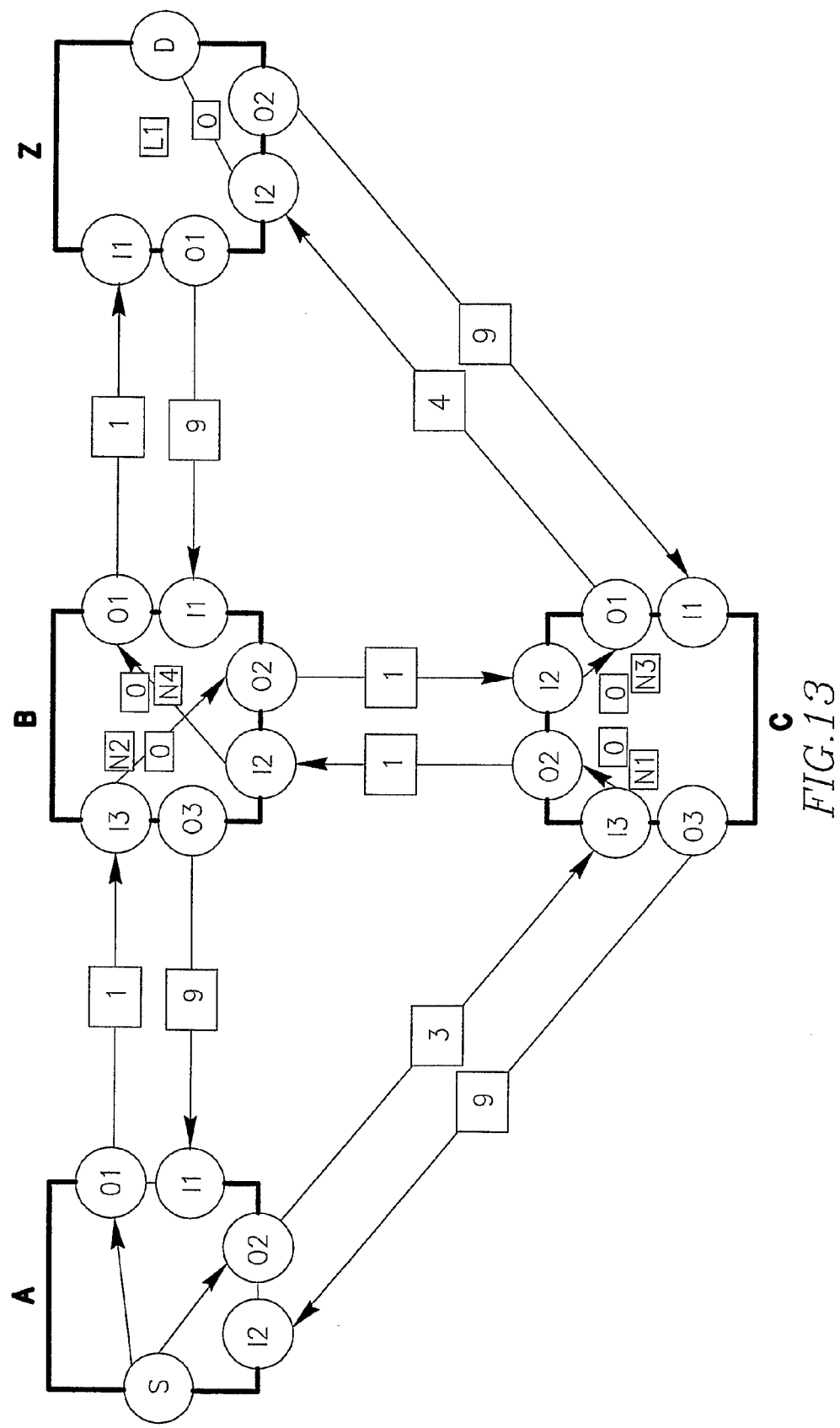
FIG. 13 illustrates an example of a transformed network topology graph obtained from the graph of FIG. 12, and explains the proposed method using the transformed topology graph.

The path finding procedure proposed by the Inventor includes a step of introducing intra-node connectivity (fictitious links) FIG. 13 illustrates how it helps to systematically find the feasible LSP path.

FIG. 13 shows the pruned topology after completing the intra-node connectivity step. Only the following intra-node connections have remained:

(1) Fictitious links, with zero metric, from "S" (source) to all outgoing link directions (to output ports 1 and 2 marked O1, O2)

(2) Fictitious link, with zero metric, from any incoming link direction (that has a link protecting backup LSP) to destination "D". For example, it is node's Z Input port 2 (I2) to "D" (due to backup LSP L1 of FIG. 12).

(3) Fictitious link with zero metric in a node, if the node has a protecting backup path in the pruned graph. This includes node's B port 3 to 2 (due to backup LSP N2), node's B port 2 to 1 (N4), node's C port 3 to 2 (N1), node's C port 2 to 1 (N3)—refer to FIG. 12.

Figure 14:
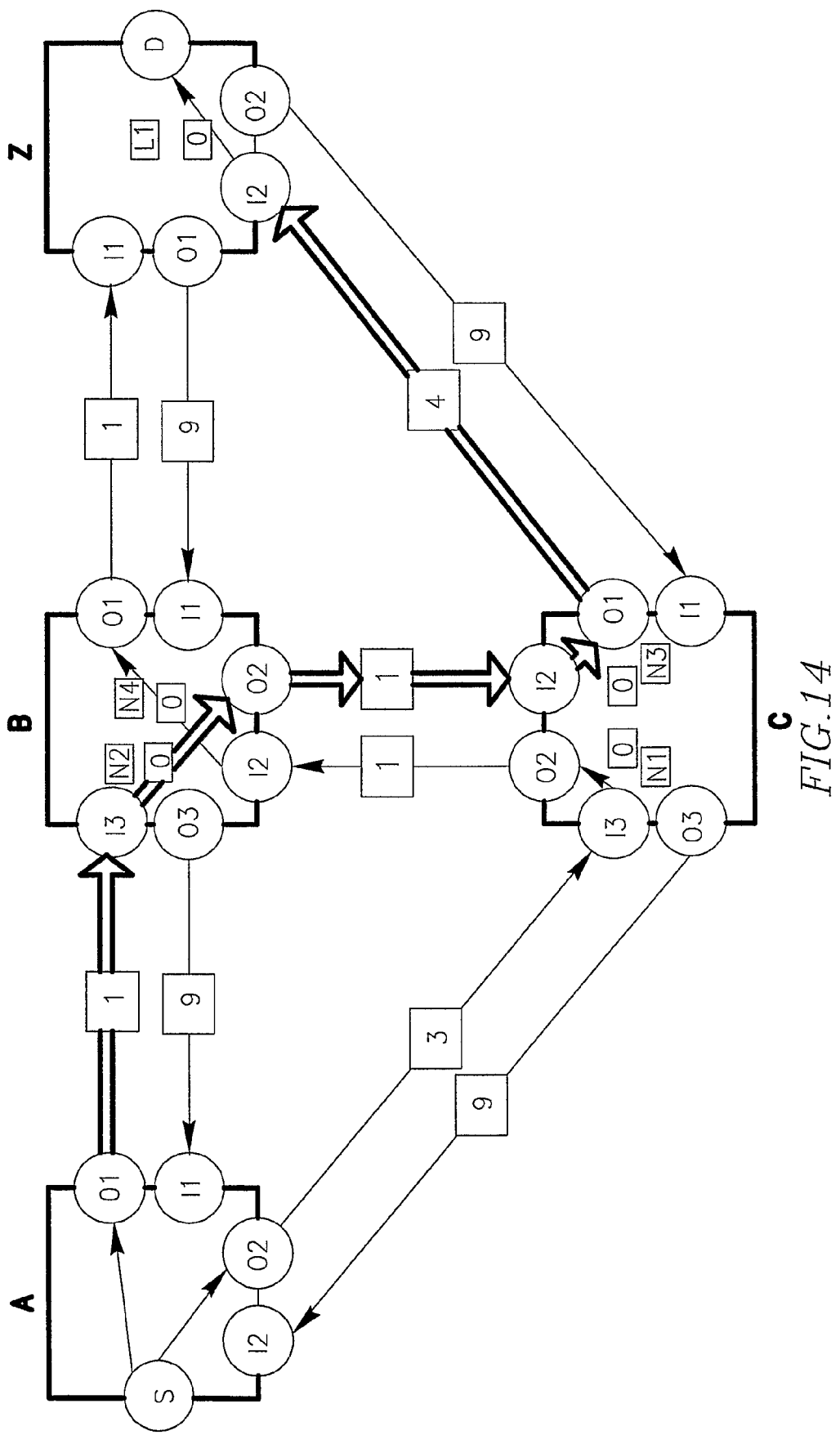
FIG. 14 shows how a required shortest fully node protected feasible communication path can be selected using the transformed topology graph of FIG. 13.

FIG. 14 shows the selected primary LSP path after executing a standard shortest path algorithm, such as Dijkstra's, on the pruned topology. The selected path is a thick line A->B->C->Z, metric 1+1+4=6, having node protection when B or C fails, and link protection when last hop C to Z fails. In this simple example it can be seen that there is no other feasible path from A to Z. For example, there is no intra-node fictitious link from node's Z port 1 to "D" and thus the LSP cannot be allowed to pass via the link direction B to Z.

Figure 15:
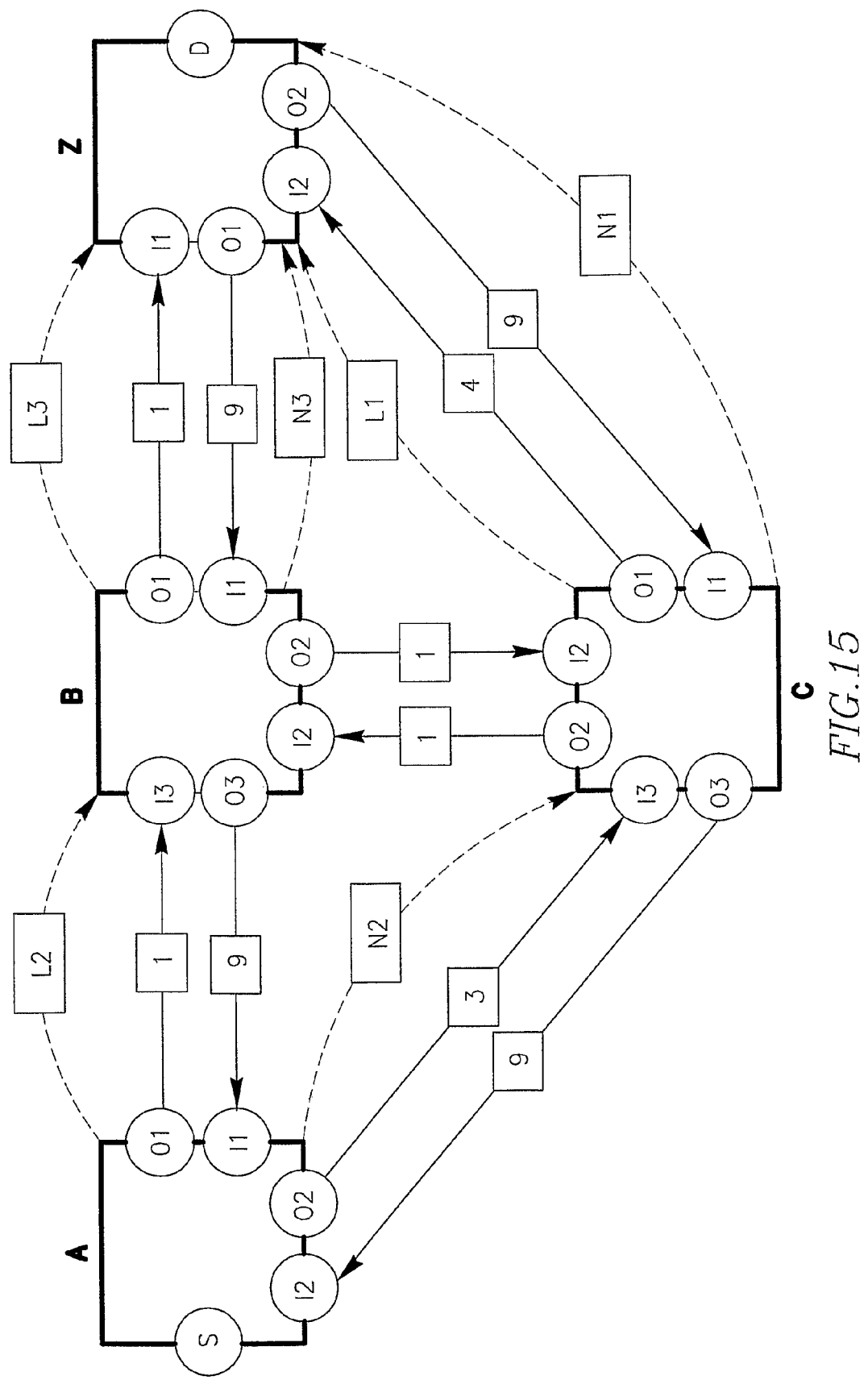
FIG. 15 shows yet another possibility of initial network topology graph before introducing intra-node fictitious links.

FIG. 15 depicts a sample network topology containing nodes (LSRs) A, B, C, and Z, interconnected as follows: (1) bidirectional links as in FIG. 12 (2) node protecting backup LSPs: C->Z (marked as N1 and protecting against a failure of B), A->C (N2, B), B->Z (N3, C) (3) link protecting backup LSP C->Z (marked as L1 and protects against a failure of link direction from C to Z), A->B (L2), B->Z (L3). It is desired to find a primary LSP path from A to Z, wherein this primary LSP must have the guaranteed FRR link-node protection. In this simple example, it can be seen that there are 4 possible LSP paths as in FIG. 12 (A->B->C->Z; A->B->Z; A->C->B->Z; A->C->Z), of which only two are feasible: (1) A->B->C->Z, due to having node or link protection on all hops (N2 in case of B failure, N3 in case of C failure, L1 in case of C to Z failure) (2) A->B->Z, due to having node or link protection on all hops (L2 in case of A to B failure, L3 in case of B to Z failure).

The path finding procedure below will explain how to systematically find these two feasible paths and select the shortest one.

Figure 16:
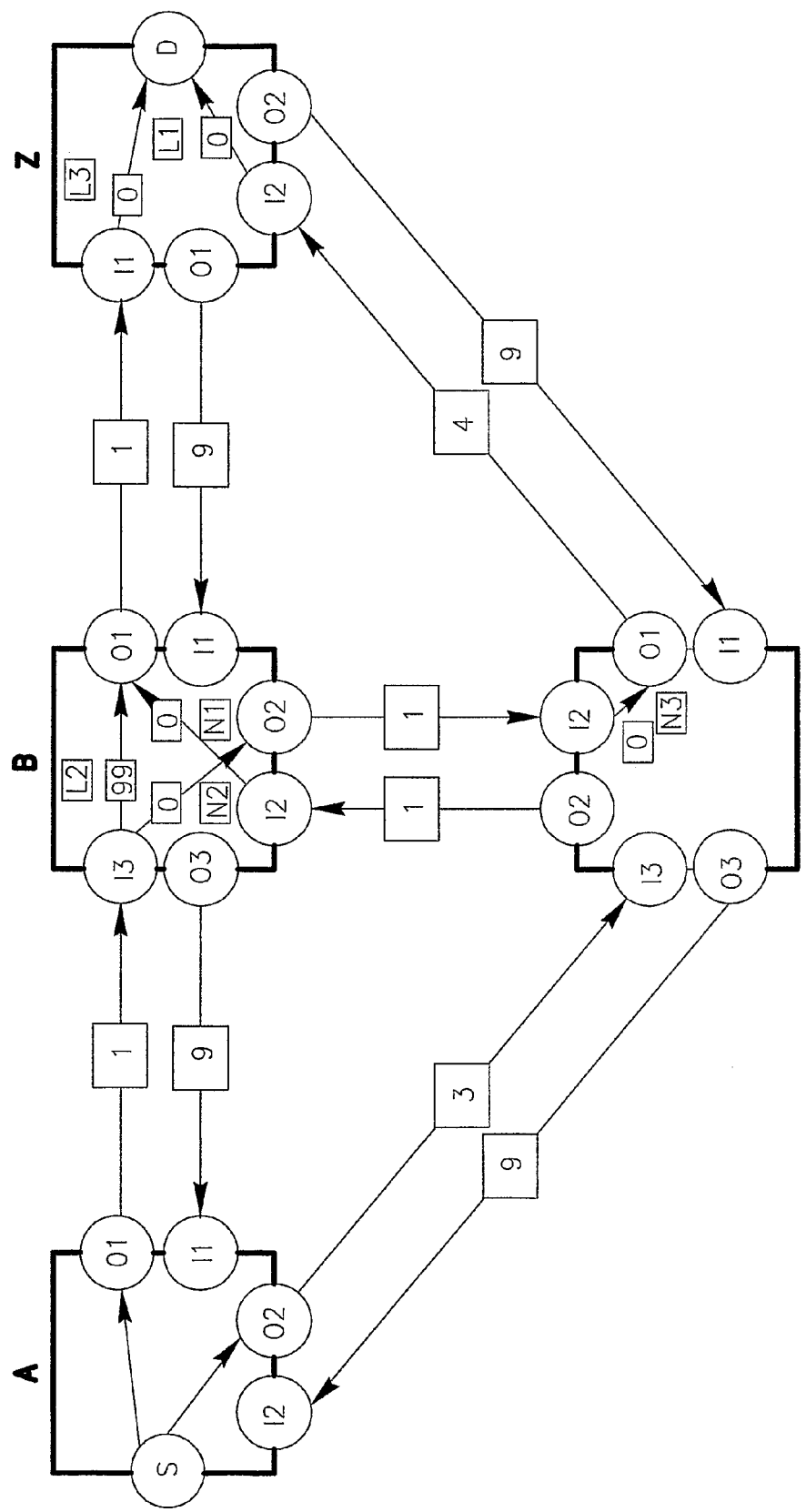
FIG. 16 illustrates the transformed network topology graph after introducing the suitable intra-node connectivity into the graph of FIG. 15.

FIG. 16 shows the pruned topology after completing the intra-node connectivity step. Only the following intra-node connections have remained: (1) Link direction with zero metric from "S" to all outgoing link directions, (always done for a source node); (2) Link direction with zero metric from any incoming link direction that has link protecting backup LSP to "D" (destination node). This includes Z port 2 to "D" (due to backup LSP L1), and Z port 1 to "D" (L3); (3) Link direction with zero metric from any incoming link direction that has node protecting backup LSP to the outgoing link direction that goes to the backup LSP's NNH. This includes node B port 3 to 2 (due to the backup LSP N2), node B port 2 to 1 (N1), node C port 2 to 1 (N3); (4) Link direction with the predefined non-zero metric penalty P (P=99 is used in this example) from any incoming link direction, that has link protecting backup LSP, to any unmatched outgoing link direction. This includes node B port 3 to 1 (due to the backup LSP L2).

Figure 17:
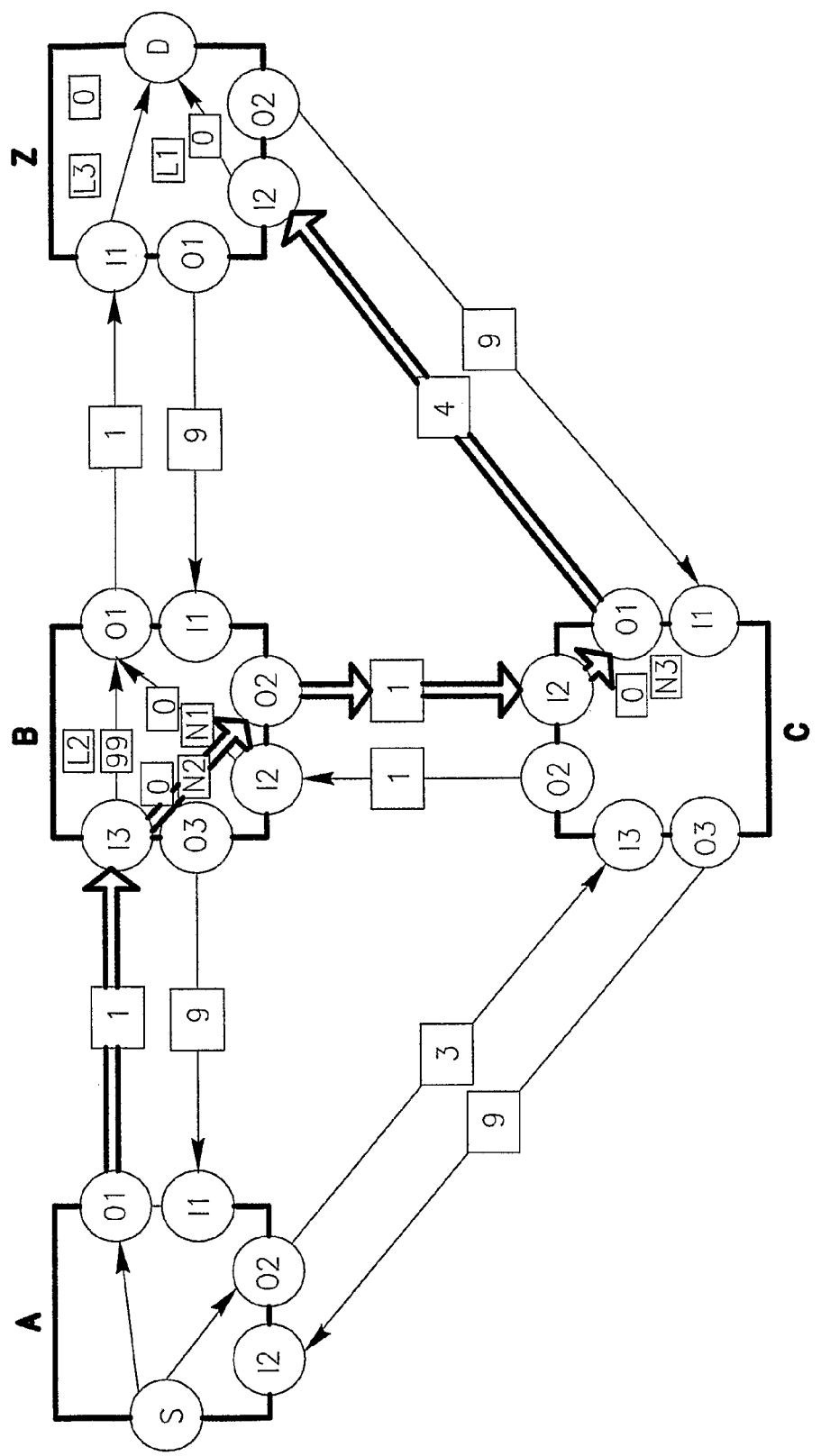
FIG. 17 illustrates how the shortest fully node-link protected feasible communication path is selected in the network using the transformed graph of FIG. 16.

FIG. 17 shows the selected primary LSP path after executing a standard shortest path algorithm such as Dijkstra's on the pruned topology. In this simple example, it can simply be seen that two feasible paths can be found: (1) A->B->C->Z, with metric of 1+1+4=6; (2) A->B->Z, with metric of 1+99+1=101. The path A->B->C->Z is "shorter" and is thus selected. This path has node protection against the failure of B or C, and link protection against the failure of the last hop C to Z. Note that although the path A->B->Z is shorter in the links metric (1+1=2), the intra-node metric penalty of 99 at node B significantly increases its total metric, and it is eventually not selected. The intra-node penalty therefore gives a predefined preference for node protection, if available (A->B->C->Z is fully node protected), over link protection (A->B->Z is fully link protected).

Figure 18:
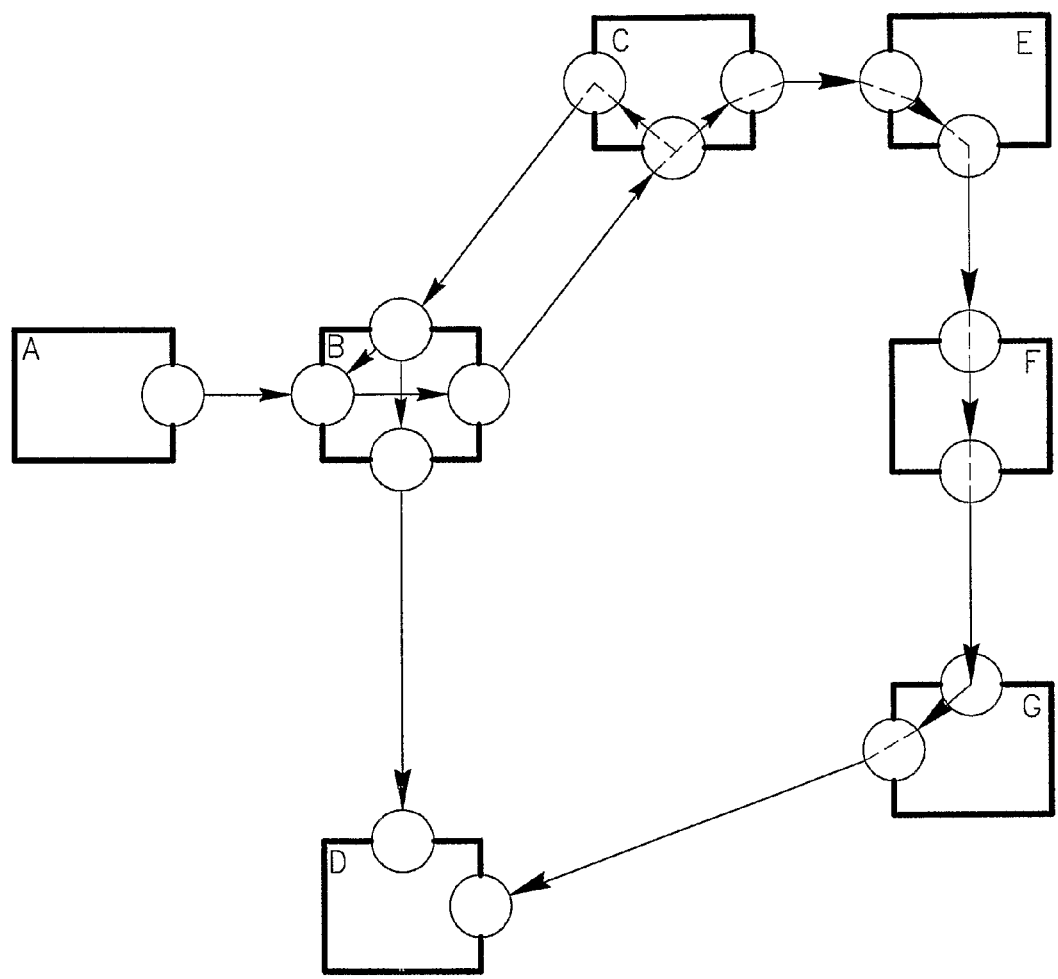
FIG. 18 illustrates applying a Constrained Dijkstra algorithm to obtain a loop-free FRR communication path.

FIG. 18 helps to explain an example of determining a loop-free FRR guaranteed path in the illustrated network.

Let the illustrated network actually represents its transformed graph.

We will apply a constrained Dijkstra algorithm to the transformed graph.

The constrained Dijkstra algorithm is described, for example, by Timothy Y. Chow, Fabian Chudak and Anthony Ffrench in their paper "Fast Optical Layer Mesh Protection Using Pre-Cross-Connected Trails", Section 7.

The constrained Dijkstra works with a directed graph with a source node (A), where each of the links has a nonnegative weight.

The constrained Dijkstra seeks for the shortest admissible path from a source node A to a specific node in the graph. A path is admissible if it is loop-free.

Like in the classic Dijkstra algorithm, at each step of the constrained algorithm a specific node is designated to be the active node and one of the partial paths arriving from source node A to that specific node is designated to be the active partial path. Partial paths are extended by one node at a time, at a current active node. Like the classic Dijkstra algorithm, the constrained Dijkstra keeps the partial paths in a tree-like data structure, so that it can quickly find the shortest partial path when needed.

The main approach of the constrained Dijkstra is as follows: We "probe forward" from a current active node. Suppose that C is an active node and that ABC is the active partial path. We consider each link outgoing from node C. A link is forbidden if it goes to a node that is already contained in the active partial path. We ignore forbidden links and move on to consider other outgoing links.

Let us find the shortest loop-free FRR guaranteed path from A to D in the illustrated transformed graph.

Note that would we ignore the loop-free constraint, the shortest path from A to D could be determined as A→B→C→B→D. However, if the loop-free constraint is valid, this path is not admissible because it contains B twice, i.e., forms a loop.

Initially A is the active node. If we (with the aid of Constrained Dijkstra) probe forward, there is one possible path— A→B→C. That path becomes the current active partial path, and node C becomes the current active node.

We then probe to go forward from C. We cannot move to B via link CB, because B is forbidden as it is already contained in the active partial path A→B→C. Probing forward to E is all right, and we add to our database a new current partial path A→B→C→E; the current active node is now node E. The mentioned partial path A→B→C→E in fact becomes the new active partial path since no other admissible path is available.

From the current active node E, we probe forward to F. Continuing in this way, we find that the resulting shortest admissible path is A→B→C→E→F→G→D.

It should be appreciated that other versions of the proposed method might be suggested to be used for various kinds of a mesh network and utilizing variations of the proposed constrains and criteria. Such versions should be considered part of the invention whenever covered by the general definition of the invention in the claims which follow.

The invention claimed is:

1. A method for routing data packets in a mesh network, comprising:
    selecting a fully protected communication path between a source node and a destination node in the mesh network, said communication path being assembled from path segments each presenting either a node path segment N or a link path segment L and each being protected with a backup path in said network, wherein each node path segment N comprises a node, a link incoming to said node and a link outgoing from said node, while each link path segment L comprises a single link outgoing from one associated node and incoming to another associated node,
    defining a required protection type for said communication path, being either a node protection, or a node-link protection,
    finding a primary path being said fully protected communication path, by selecting each specific path segment for said primary path according to initial user's requirements and topology information on the network, and by using the following rules:
        a) for any of said protection types, selecting a specific node path segment N for the primary path upon ensuring that said specific node path segment N can be protected in the network by a node backup path satisfying said initial user's requirements,
        b) if the node protection is defined, selecting for the primary path only a single specific link path segment L comprising a link incoming to said destination node, upon ensuring that said single specific link path segment L can be protected in the network by a link backup path satisfying said initial user's requirements,
        c) if the node-link protection is defined, selecting for the primary path a specific link path segment L only if it is impossible to select a node path segment N thereinstead, upon ensuring that said specific link path segment L can be protected in the network by a link backup path satisfying said initial user's requirements; and
    routing the data packets along thus selected fully protected communication path between the source node and the destination node.

2. The method according to claim 1, further comprising finding, in a single phase, the primary path being said fully protected communication path.

3. The method according to claim 1, wherein the communication path is a Label Switched Path (LSP), the mesh network is a Multiprotocol Label Switching (MPLS) network, and said protection is a guaranteed Fast Reroute (FRR) segment protection.

4. The method according to claim 1, wherein the initial user's requirements include at least the source node, the destination node, the required protection type and quality of service (QoS) requirements comprising at least bandwidth requirements of the communication path.

5. The method according to claim 4, wherein the initial user's requirements include at least one additional requirement from the following non-exhaustive list: the maximal metric allowed for the path, class of service (CoS), path bidirectionality, loop-free constraint.

6. The method according to claim 1, wherein the topology information is represented as a weighted directed topology graph of nodes and interconnecting links, wherein each node and link is associated with resources and/or topology constraints, including information concerning available node backup paths and link backup paths.

7. The method according to claim 6, comprising: a step of introducing intra-node connectivity and transforming said topology graph into a transformed graph, by adding to the topology graph fictitious intra-node links, the step comprises adding a fictitious intra-node link with a zero metric into the node of a node path segment to interconnect the incoming link and the outgoing link of said node segment, if there is a node backup path for said path segment in the topology graph.

8. The method according to claim 7, wherein the step of introducing intra-node connectivity further comprises an additional operation of adding to the topology graph further fictitious intra-node links with non-zero metric, wherein a fictitious intra-node link with a non-zero metrics is added to the node of a node segment to interconnect the incoming link and the outgoing link of said node segment, if there is no node backup path for said node path segment in the topology graph, while there is a link backup path for the incoming link of said node path segment.

9. The method according to claim 1, further comprising applying a computation algorithm for finding, in said network, an optimal path based on a predetermined criterion.

10. A software product comprising computer implementable instructions and/or data for carrying out the method according to claim 1, stored on an appropriate computer readable non-transitory storage medium so that the software is capable of enabling operations of said method, when used in a computer.

* * * * *